United States Patent
Matthews

[15] 3,648,016
[45] Mar. 7, 1972

[54] ARC WELDING ELECTRODE HOLDER

[72] Inventor: Charles G. Matthews, 1647 Semmes St., Memphis, Tenn. 38114

[22] Filed: Mar. 24, 1971

[21] Appl. No.: 127,679

[52] U.S. Cl. ...........................................219/142
[51] Int. Cl. .........................................B23k 9/28
[58] Field of Search ..................................219/142

[56] References Cited

UNITED STATES PATENTS 2,233,618   3/1941   Leach ..................................219/142
2,418,681   4/1947   Wells ...................................219/142

Primary Examiner—C. L. Albritton
Attorney—John R. Walker, III

[57] ABSTRACT

An arc welding electrode holder having a conductive base member which is covered by an insulating material defining a handle. The distal end of the handle includes a disklike splatter shield for protecting the hand of the user and reducing muscle fatigue while grippingly supporting the holder and the heavy electrical cable attached thereto. The electrode is clampingly held by one end thereof extending inwardly through a transverse aperture in an amazingly durable insulated cuplike member defining the outermost end of the holder. The open end of the cuplike member, being directed rearwardly, circumferentially engages a nutlike member which is threadedly received on a bolt that extends longitudinally forward from a threaded socket in the base member. The bolt is fixedly secured to the base member so that manual rotation of the cuplike member tends to seat the head of the bolt against the interior bottom of the cuplike member, causing the electrode received in the aperture to be clamped between the flat surfaces of the head of the bolt and the interior bottom of the cuplike member.

3 Claims, 5 Drawing Figures

Patented March 7, 1972
3,648,016
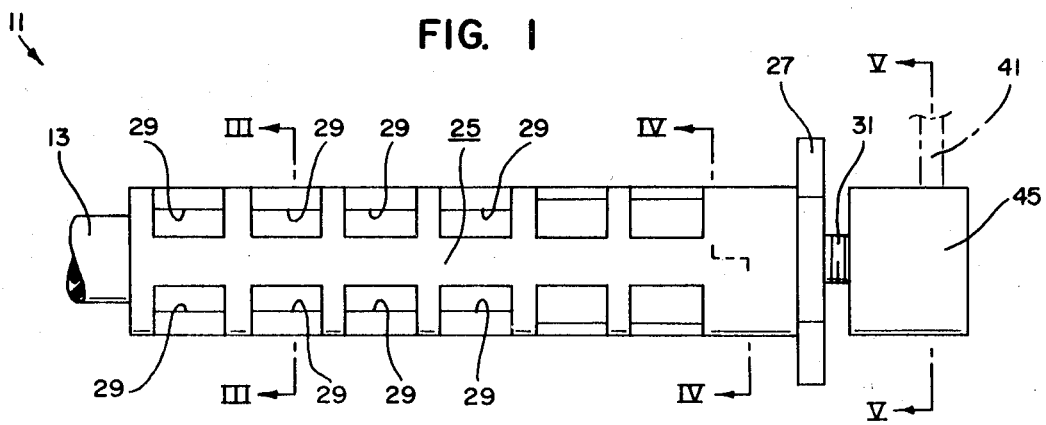
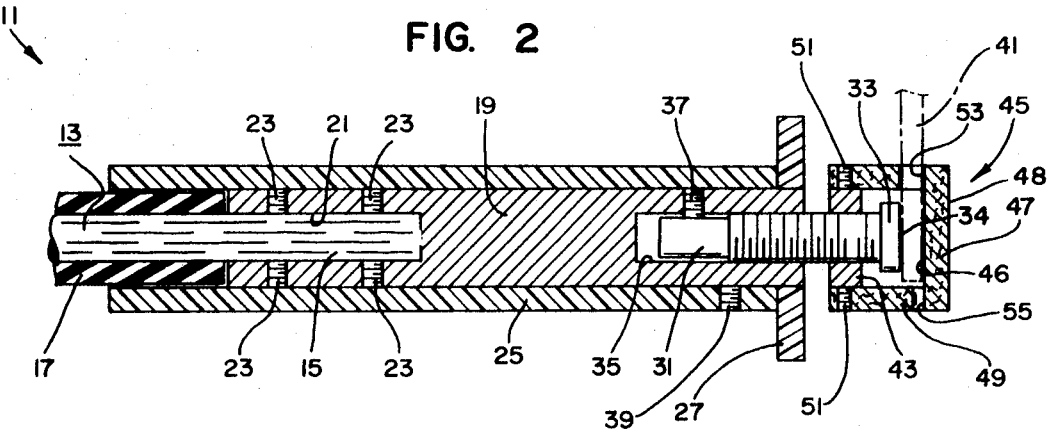
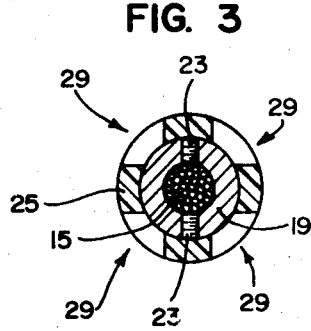
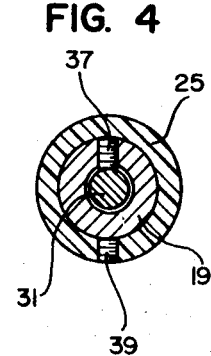
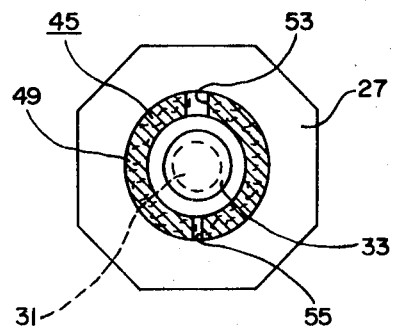
INVENTOR.
CHARLES G. MATTHEWS
BY John R. Walker, III
   attorney

ARC WELDING ELECTRODE HOLDER

BACKGROUND OF THE INVENTION

1. Field of the Invention

This invention relates to electrode holding devices for electric arc welding equipment.

2. Description of the Prior Art

Probably the oldest and most prevalent electrode holding devices in this particular field are the well-known alligator clamping devices which carry a trade name of Jackson or Lincoln clamps. A prevailing problem with these clamps is that the metallic jaws for gripping the electrode are exposed, and in the process of welding, these jaws become contaminated from the splatter of the welding process and as a result, eventually do not make optimum electrical connection with the electrode or the welding rod.

It should be pointed out that when the electrical connection between an electrode and the electrical source is interrupted unintentionally as by contamination, etc., during the welding process, an arc blow is produced at the end of the normal arc and causes a swirling effect resulting in the metal from the welding rod being deposited irregularly which in turn results in a substandard or inferior weld.

It is conceivable that Arthur R. Welch recognized this problem 45 years ago when he invented his electrode holder, U.S. Pat. No. 1,599,259. The '259 patent includes structure for protecting the electrode holding elements from becoming contaminated. The insulating material disclosed in the '259 patent is Bakelite. Bakelite has the advantage of being easily molded to conform to odd-shaped objects but it is very brittle and easily broken, e.g., in the event the holder is inadvertently dropped or rough-handled in other ways.

Other patents known by the applicant consist of: the Sweda, U.S. Pat. No. 2,118,274; the Carbis, U.S. Pat. No. 2,277,298; the Hooper et al., U.S. Pat. No. 2,294,033; and the Feldman, U.S. Pat. No. 3,191,002. The applicant also has knowledge of an electrode holder manufactured by the Martin Wells Co. of Los Angeles, Calif., having U.S. Pat. Nos. 1,706,907 and 2,322,077 embossed thereon and followed by the words "other patents Pending."

Certain of the above electrode holding devices are provided with structural reinforcement, such as a metallic sleeve or wire grid or the like. However, for various reasons, the electrical connection between the electrode and the elements holding the electrode becomes intermittently interrupted, e.g., the cause might be contamination and/or insufficient surface engaging the electrode, etc., resulting in the above-described arc blow. Additionally, a rapid change of current magnitude is simultaneously inevitable. This action results in voltage being induced onto the wire grid, etc., by mutual inductance. This mutual inductance causes current flow in these adjacent metallic structural objects and as a result thereof, considerable heat is generated which causes molecular breakdown of the insulating structure. Obviously, when the insulation is no longer effective, the electrode holder becomes a hazard to the user, e.g., flashes and/or burns may result from the holder coming in contact with adjacent electrically grounded structure, a problem well known to those skilled in the art.

SUMMARY OF THE INVENTION

The present invention is directed towards overcoming the disadvantages and problems relative to previous welding electrode holders. The concept of the present invention is to provide an inexpensive welding electrode holder having simple and durable structure. Additionally, the holder of the present invention holds the electrode more positively, resulting in a stable arc because the current is steady.

A particular feature of the present invention is the "vise grip" method for gripping the electrode. Thus, this obviates the problem of intermittently interrupting the electrical connection, a problem prevailing in certain prior holding devices.

Recent advancements in the field of plastics have resulted in the development of an amazingly durable insulating material, i.e., and asbestos high-temperature phenolic base plastic compound. This insulation will withstand temperatures in excess of 3,000° F. without breaking down and is substantially indestructible with regards to dropping and/or other usual rough handling.

The arc welding electrode holder of the present invention includes a conductive base member which is covered by an insulating material defining a handle. The distal end of the handle includes a disklike splatter shield for splatter the hand of the user and reducing muscle fatigue while grippingly supporting the holder and the heavy electrical cable attached thereto. The weight supporting feature of the splatter shield probably can be better appreciated when one considers the muscle strain involved by a welder grippingly holding an electrode holder over a prolonged period of time, e.g., a normal 8-hour day. This problem is particularly tiring when the welder is working overhead since the length of the electrical cable is increased which adds considerable weight to the load supported in the hands of the welder. Utilizing the holder of the present invention, he no longer needs to support this load by gripping the holder since the splatter shield rests against the curled thumb and forefinger, thus preventing the holder from slipping out of his gloved hand.

The electrode or welding rod is clampingly held by one end thereof extending inwardly through a transverse aperture in an insulated cuplike member defining the outermost end of the holder. The cuplike member preferably is formed from the above-described asbestos high-temperature phenolic base plastic compound. Additionally, it may be desirable to integrally form the handle and splatter shield from this same plastic compound. However, I have found that fiberglass insulating material is suitable for this latter purpose.

The open end of the cuplike member, being directed rearwardly, circumferentially engages a nutlike member which is threadedly received on a stud that extends longitudinally forward from a threaded socket in the base member. The forward end of the stud is provided with an enlarged head or vise jack having a substantially flat surface directed outwardly therefrom. The stud is fixedly secured to the base member so that manual rotation of the cuplike member tends to seat the vise jack against the interior bottom of the cuplike member, causing the electrode received in the aperture to be clamped in a vise grip manner between the flat surfaces of the vise jack and the interior bottom of the cuplike member.

BRIEF DESCRIPTION OF THE DRAWINGS

FIG. 1 is a side elevational view of the arc welding electrode holder of the present invention.

FIG. 2 is a sectional view of the holder of FIG. 1 taken as on a vertical plane through the longitudinal axis thereof.

FIG. 3 is a sectional view taken as on the line III—III of FIG. 1.

FIG. 4 is a sectional view taken as on the line IV—IV of FIG. 1.

FIG. 5 is a sectional view taken as on the line V—V of FIG. 1.

DESCRIPTION OF THE PREFERRED EMBODIMENT

The arc welding electrode holder 11 of the present invention is intended to be attached to the one end of a power cable 13 leading from an arc welding machine (not shown) or any other well-known electrical source suitable for this purpose. The power cable 13 preferably has a conductor consisting of a plurality of copper strands 15 covered by any well-known flexible insulating material 17 so that the cable 13 may be flexible and extremely durable. The end of the power cable 13 intended to be attached to the holder 11 preferably has a portion of the insulating material 17 cut away so as to expose a predetermined length of the copper strands 15, as best viewed in FIG. 2 of the drawings.

The holder 11 includes an elongated cylindrical base member 19 formed from a highly conductive metal, e.g., brass, copper, stainless steel, or the like. The base member 19, preferably being a solid brass shaft, is provided with a first longitudinal socket 21 at the one end thereof for receiving the power cable 13. The exposed end of the copper strands 15 preferably are inserted into the socket 21 and fixedly attached thereto in any well-known manner. I prefer to provide a plurality of transversely aligned apertures leading into the socket 21 for threadedly receiving a like number of conductive set screws 23 or the like, as best viewed in FIG. 2 of the drawings. Obviously, the diameter of the socket 21 should be such to allow for a close fit of the copper strands 15 so that when the set screws 23 are seated against the copper strands 15, the weight of a considerable length of cable 13 can be supported the holder 11 at a considerable height with assurance that the strands 15 will not be pulled from the socket 21. In this regard, it may be desirable that the exposed end of the copper strands 15 be suitably tinned with solder prior to being inserted into the socket 21, a technique for enhancing the holding ability of the set screws 21 and well known to those skilled in the art.

The holder 11 also includes a tubular handle 25 having an inside diameter sufficiently sized to suitably receive or envelop the close fitting base member 19. The handle 25 is formed from an electrical insulating material, e.g., fiber glass or the previously described asbestos high-temperature phenolic base plastic compound. The handle 25 provides a gripping surface for the user and insulates the base member 19 from arcing when the holder 11 contacts structure having an opposite electrical polarity than that of the power cable 13.

The holder 11 additionally includes a splatter shield 27 which serves the dual purpose of shielding the user's hand or glove from the molten metal splatter and provides a resting surface for supporting the holder 11 and the weight of the cable 13. In other words, the user can relax his fingers, allowing the splatter shield 27 to rest against his curled thumb and forefinger and the splatter shield 27 prevents the load of the cable 13 from pulling the holder 11 from the user's hand, even though he does not firmly grip the handle 25 thereof.

The handle 25 preferably is provided with a plurality of cooling slots 29 which allow for dissipation of heat generated on the base member 19 as a result of the heavy current carried thereon. Further, the handle 25 and the shield 27 may be integrally formed or the shield 27 may be fixedly attached to the handle 25 in any well-known manner, e.g., a suitable bonding agent or the like.

The base member 19 is provided with a second longitudinal socket 35 for threadedly receiving the stud 31. The stud 31 is fixedly attached to the base member 19 in any well-known manner, e.g., the base member 19 being provided with a transverse aperture extending into the socket 35 for threadedly receiving a metallic set screw 37 or the like. The handle 25 is secured to the base member 19 by a nonconductive set screw 39, e.g., teflon or the like, being threadedly received in a transverse aperture adjacent the shield 27.

From the foregoing, it should be apparent that electrical current may readily be transmitted from the power cable 13 along the length of the base member 19, the stud 31, and the vise jack 33. Accordingly, an electrode 41, when held firmly against the vise jack 33, will transmit the electrical current along the length thereof so that the usual arc may be generated adjacent the outermost end thereof for performing the normal welding operation. Therefore, the remaining structure of the holder 11 is directed towards holding the electrode 41 firmly against the vise jack 33 in a manner which safeguards the stud 31 and the vise jack 33 from becoming contaminated, a problem well defined earlier in the specification.

The holder 11 additionally includes a vise block 43, having a function and appearance somewhat like a nut, which is threadedly received on the stud 31, as best viewed in FIG. 2 of the drawings. The holder 11 further includes a vise head 45 having a cuplike shape with a substantially flat interior bottom 46. The vise block 43 preferably is formed from metal, e.g., brass or the like. However, the vise head 45 is preferably formed from the previously defined asbestos high temperature phenolic base plastic compound. As previously stated, this compound possesses all the desirable attributes for the structure herein disclosed.

The external shape of the vise head 45 is irrelevant. However, I prefer that the vise head 45 have a bottom portion 47 having flat exterior and interior surfaces 48, 46 and a circular wall 49 substantially perpendicular to the bottom 47. The vise head 45 is fixedly attached to the vise block 43 in any well-known manner, e.g., a plurality of apertures extending through the wall 49 adjacent the uppermost rim thereof for threadedly receiving a like number of set screws 51 or the like.

The vise head 45 is provided with a pair of opposing apertures 53, 55 for selectively receiving the one end of the electrode. As for example, the electrode 41 being received by the aperture 53 in FIG. 2. From FIGS. 2 and 5 of the drawings, it may be seen that the aperture 53 has a larger diameter than does the aperture 55. Accordingly, a small diameter electrode preferably is received in the aperture 55 and a large diameter electrode preferably is received in the aperture 53. The unused aperture, e.g., aperture 55, serves the purpose of venting the interior of the vise head 45 for the purpose of dissipating heat during the welding process.

From the foregoing, it should be apparent that manual rotation of the vise head 45 causes the vise block 43 to carry the vise head 45 inwardly towards the vise jack 33 which will in turn cause the electrode 41 to be clamped in a vise grip manner between the flat surface 34 of vise jack 33 and the flat interior surface 46 of the bottom 47 of the vise head 45. Obviously, the apertures 53, 55 are positioned substantially as depicted in FIG. 2, i.e., adjacent the interior flat surface 46 of the bottom 47.

Although the invention has been described and illustrated with respect to a preferred embodiment thereof, it is not to be so limited since changes and modifications may be made therein which are within the full intended scope of the present invention.

I claim:

1. An arc welding electrode holder for fixed attachment to the one end of a power cable leading from an arc welding machine comprising an elongated cylindrical conductive base member provided with first longitudinal socket means at one end thereof for suitably receiving the power cable, tubular handle means having distal and proximal ends enveloping said base member for insulating said base member and being arranged so that said proximal end thereof is circumjacent the power cable, conductive studlike means having distal and proximal ends, said proximal end thereof having at least a portion thereof threaded, conductive vise jack means having a broad flat surface attached to said distal end of said studlike means, said base member additionally being provided with second longitudinal socket means at the other end thereof remote from said one end for receiving said studlike means to said base member so that said studlike means is adapted to transmit electrical current along the length thereof from said base member to said vise jack means, nutlike vise block means threadedly received on said studlike means, insulated cuplike vise head means having a substantially flat interior bottom and being provided with a transverse hole adjacent said bottom thereof for receiving an electrode, said vise head means being fixedly attached to said vise block means so that manual rotation of said vise head means causes said vise block means to carry said vise head means inwardly towards said vise jack means which will in turn cause the electrode received in said hole to be clamped between said vise jack means and said vise head means.

2. The holder of claim 1 in which is included shield means fixedly attached to said handle adjacent said distal end thereof for shielding the hand of the user, said shield means extending a substantial predetermined distance radially outward from said handle means.

3. The holder of claim 1 in which said vise head means is integrally formed from asbestos high-temperature phenolic base plastic compound.